(12) United States Patent
Nurmi

(10) Patent No.: US 7,469,125 B2
(45) Date of Patent: Dec. 23, 2008

(54) ENHANCED METHOD OF TRANSFERRING DATA FROM A DATA ORIGINATING DEVICE TO A MOBILE TERMINAL

(75) Inventor: Mikko Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 919 days.

(21) Appl. No.: 10/870,723

(22) Filed: Jun. 17, 2004

(65) Prior Publication Data

US 2005/0282490 A1 Dec. 22, 2005

(51) Int. Cl.
*H04Q 7/20* (2006.01)

(52) U.S. Cl. .......................... 455/11.1; 455/7; 455/445; 455/414.1; 455/426.1; 455/422.1; 370/310; 370/315; 370/432; 709/203; 709/202; 709/218; 709/219; 709/228

(58) Field of Classification Search ................ 455/11.1, 455/414.1, 414.2, 414.3, 466, 422.1, 403, 455/418–420, 558, 550.1, 552.1, 445, 500, 455/517, 426.1, 426.2, 41.2, 41.3, 557, 24, 455/41.1; 709/203, 202, 218, 219, 228, 229, 709/556.1; 370/310, 312, 315, 328, 329, 370/338, 343, 432
See application file for complete search history.

(56) References Cited

U.S. PATENT DOCUMENTS

| 5,903,851 | A | * | 5/1999 | Backstrom et al. | ........... 455/557 |
| 6,243,581 | B1 | * | 6/2001 | Jawanda | ................... 455/432.2 |
| 7,113,745 | B2 | * | 9/2006 | Khayrallah | ................. 455/41.2 |
| 7,254,615 | B2 | * | 8/2007 | Taib et al. | .................... 709/209 |
| 2003/0119537 | A1 | * | 6/2003 | Haddad | ...................... 455/517 |

OTHER PUBLICATIONS

Panagiotis Papadimitratos and Zygmunt J. Haas, "Secure Data Transmission in Mobile Ad Hoc Networks," ACM Workshop on Wireless Security (WiSe 2003), San Diego, CA, Sep. 19, 2003, 10 pages.

* cited by examiner

*Primary Examiner*—Keith T Ferguson
(74) *Attorney, Agent, or Firm*—Hollingsworth & Funk, LLC

(57) ABSTRACT

The present invention relates to a method for transferring data from a data originating device to a first mobile terminal. A request identifying at least part of the required data is defined by the first mobile terminal and sent to at least one intermediary mobile terminal. The intermediary mobile terminal sends to the data originating device a request for transmitting the data requested by the mobile terminal. The received data is transmitted from the intermediary mobile terminal to the first mobile terminal.

23 Claims, 2 Drawing Sheets

ENHANCED METHOD OF TRANSFERRING DATA FROM A DATA ORIGINATING DEVICE TO A MOBILE TERMINAL

FIELD OF THE INVENTION

The present invention relates to a method of transferring data, and more particularly to downloading data to mobile terminals.

BACKGROUND OF THE INVENTION

Besides data carrying speech information, the amount of transferred data carrying information in other formats, such as HTML (hypertext mark-up language) or WML (wireless mark-up language) pages, have increased in mobile networks. This is due to enhanced data transmission technologies, and advanced terminals and applications facilitating the use of terminals also for other purposes than for speech.

As more efficient transmission technologies for mobile environments and for bursty traffic have been developed, the size of transferred data units or sequences has also increased for instance due to an increased transfer of image data. In current mobile systems data is transferred to a mobile terminal via a wireless link between the mobile terminal and a mobile network element. The size of files or streaming data can be fairly large and the delay caused by downloading a large file or some other kind of information entity from a data source over a mobile connection to a mobile terminal can be irritating for the user.

BRIEF DISCLOSURE OF THE INVENTION

There is now provided an enhanced method for transferring data. The objects of the invention are achieved by a method, a system, mobile terminals, a module, and computer programs, which are characterized by what is stated in the independent claims. Some preferred embodiments of the invention are disclosed in the dependent claims.

The invention is based on the idea of using one or more intermediary mobile terminals to convey at least part of the desired data to a data requesting (first) mobile terminal. Thus, a request identifying at least part of the required data is defined by the first mobile terminal and sent to at least one intermediary mobile terminal. The intermediary mobile terminal sends to the data originating device a request for transmitting the data requested by the mobile terminal. The received data is transmitted from the intermediary mobile terminal to the first mobile terminal.

An advantage of the method and arrangement of the invention is that available data transmission resources of other mobile terminals may be used. For instance, a wireless local area networking technique providing high speed data transfer may be used between the mobile terminals. By using intermediary mobile terminals, it is possible to reduce the effect of the typical bottleneck between a mobile terminal and a base station of a mobile network, i.e. multiple logical wireless connections may be used to deliver the data to the requesting first mobile terminal. This can considerably speed up the transmission of the desired data to the requesting first mobile terminal. For instance, the desired data may be divided such that a group of five intermediary mobile terminals are used to convey the data to the first mobile terminal.

BRIEF DESCRIPTION OF THE DRAWINGS

In the following, the invention will be described in greater detail by means of preferred embodiments with reference to the accompanying drawings, in which.

DETAILED DESCRIPTION OF THE INVENTION

Figure 1:
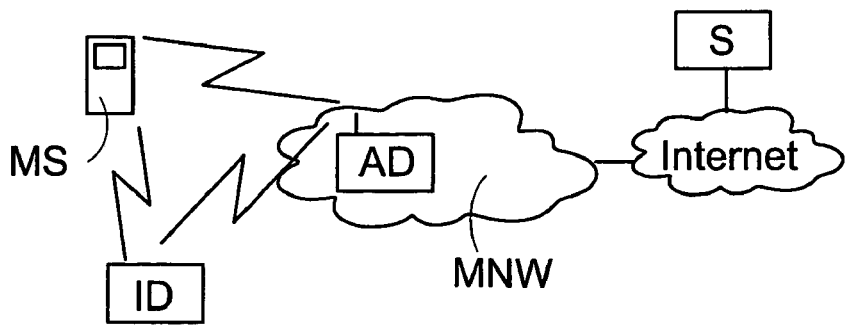
FIG. 1 is a system configuration according to an embodiment of the invention.

FIG. 1 is a block diagram illustrating an arrangement according to an embodiment. In the arrangement, data transmission from a data source, such as a server S connected to the Internet, to a mobile terminal MS is done directly from an access device AD or via an intermediary device ID. As will be illustrated in more detail later, the intermediary device ID may be assigned to transfer part of the data, for example a file, to the mobile terminal MS.

Data may be transmitted to/from the MS by a base station of a mobile network MNW. Conventional mobile network elements and functions may be included in the MNW. For instance, the MNW may support the GSM (Global System for Mobile Communications), GPRS (General Packet Radio Service), 3GPP ($3^{rd}$ Generation Partnership Project), a $4^{th}$ generation mobile network, or WLAN (Wireless Local Area Network) standards. The server S may reside in another network NW, for instance in a secure intranet, typically accessible by the Internet. The system illustrated in FIG. 1 is only exemplary, and the invention can be applied to any kind of system comprising a server, a mobile terminal, and a device functioning as an intermediary device ID. The mobile terminal MS may be any mobile electronic device equipped with a transceiver, for instance a laptop or a desktop computer, a PDA device, or a mobile station. This also applies to the intermediary device ID. Thus, no specific intermediary devices ID need to be added to networks, but appropriately configured already existing devices, such as mobile phones, may be used.

Local connectivity may be arranged between the mobile terminal MS and an intermediary device ID directly or via a third element. For this a local area connectivity in accordance to some local area networking technology may be utilized. For instance, IEEE 802.11i standard based WLAN connectivity or Bluetooth connectivity may be used. However, the invention can also be applied to other IEEE 802-based wireless local area networks or to other types of current or future local networks, typically to networks operating on un-licensed frequency bands, such as a network according to the BRAN (Broadband Radio Access Networks) standard or a Home RF network. These local networks are often created in an ad-hoc manner when two or more terminals are connected. The BRAN standards comprise High Performance Radio Local Area Network HIPERLAN standards of types 1 and 2, HIPERACCESS and HIPERLINK standards.

Figure 2:
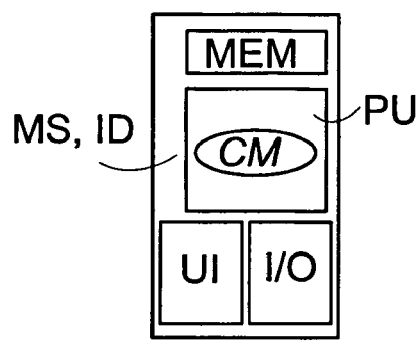
FIG. 2 illustrates a device according to an embodiment of the invention.

As illustrated in FIG. 2, the devices to which at least some of the inventive functionality may be applied (in the example of FIG. 1, the mobile terminal MS and the intermediary device ID) comprise memory MEM, a user interface UI, I/O means I/O for arranging communication, and a processing unit PU comprising one or more processors. In one embodiment, the mobile terminal MS and the intermediary device ID comprise two transceivers; one for communication between the MS and the ID and one for communication with the mobile network MNW. Computer program codes executed in the central processing unit PU may be used to make the device implement control means CM at least for controlling the selection of connection resources for handover purposes, some embodiments of which are illustrated later in association with FIGS. 3 and 4. In one embodiment, at least some of the features relating to the invention are implemented in application software making requests for serving data transfer protocol. A chip unit or some other kind of module for controlling the device (MS, ID) may in one embodiment cause the device to perform the inventive functions. The module may form part of the device and could be removable, i.e. it could be inserted into another unit or device. Computer program codes can be received via a network and/or be stored in memory means, for instance on a disk, a CD-ROM disk, or other external memory means, from where they can be loaded into the memory MEM of the processing device. Hardware solutions or a combination of hardware and software solutions may also be used to implement the inventive functions.

Figure 3A:
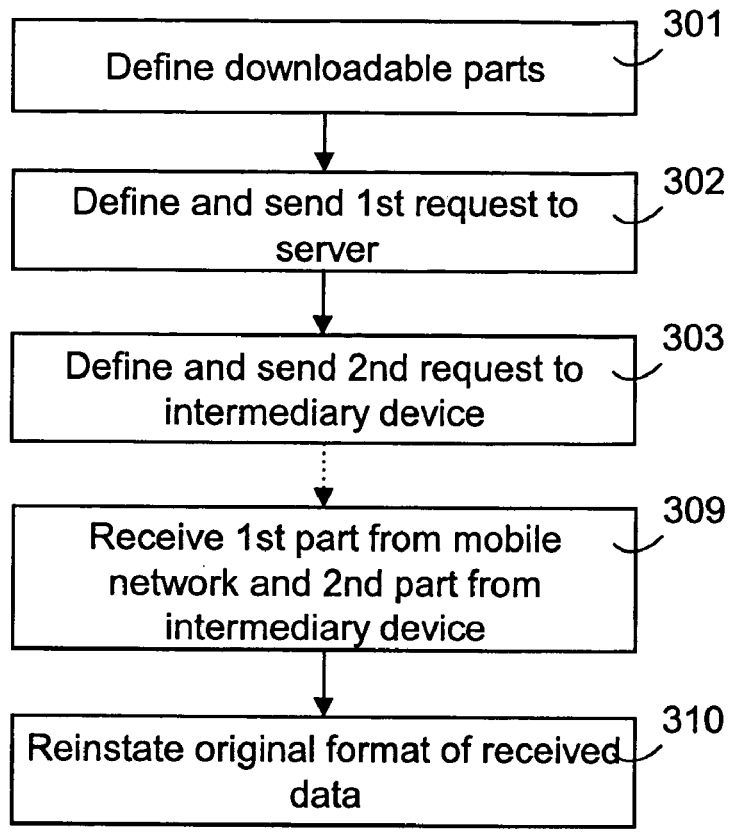
FIGS. 3a and 3b are flowcharts illustrating a method according to an embodiment of the invention.
Figure 3B:
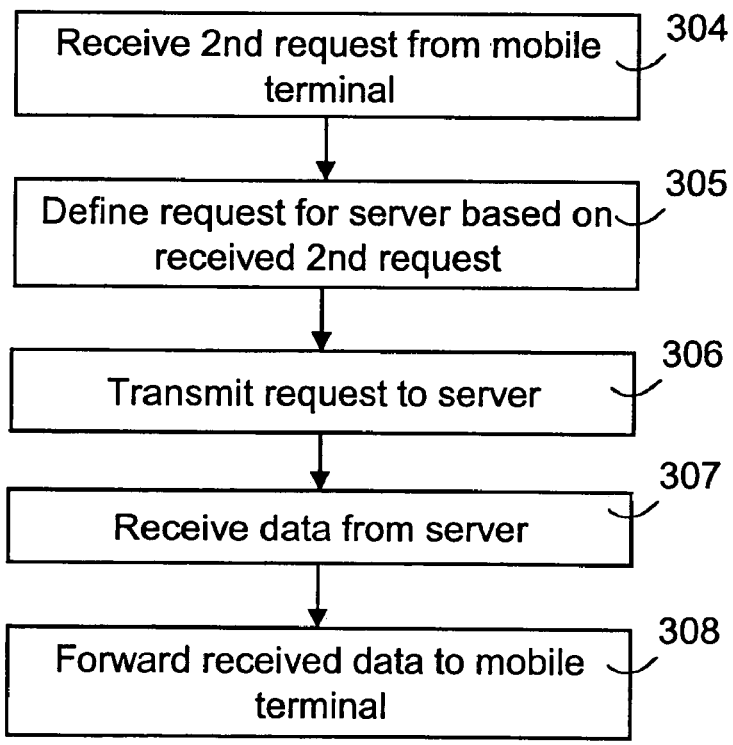

FIGS. 3a and 3b illustrate a method according to an embodiment of the invention. The features of FIG. 3a may be implemented in the mobile terminal MS to which data from a network element, such as the server S, needs to be downloaded. The need typically, but not necessarily, arises from user initiative. The mobile terminal MS defines 301 the parts of the data to be requested. There are many ways to make the definition; in one embodiment on the basis of the nature of the downloadable data. Details of some methods are illustrated later. For instance, if there are logical portions in a data entity, such as a file, to be downloaded, the intermediary device ID may be configured to determine in the first and in the second request one or more of these logical portions. On the basis of the selected parts, in the example of FIGS. 3a and 3b on the basis of the first and the second part, the mobile terminal MS then forms requests for these parts. A $1^{st}$ request is formed 302 for transferring the first part and a $2^{nd}$ request is formed 303 for transferring the second part. Some embodiments of the selection of the utilized intermediary device ID are described in more detail later.

The mobile terminal MS may be configured to send the $2^{nd}$ request to a particular intermediary device ID on the basis of a simple preference list identifying the preferred intermediary devices ID, on the basis of the location of the MS and/or ID, on the basis of the properties of the ID and/or on the basis of some other preference criterion. The requests are formed in accordance with the protocol used between the mobile terminal MS and the server S (and, further, in one embodiment between the mobile terminal MS and the intermediary device ID). The requests comprise at least identification information on the requested part, for example a URI (Uniform Resource Identifier). When IP-based networking is used, the requests may be destined to the IP address of the server S. In an alternative embodiment, the request is addressed to the ID, in which case the request preferably comprises an identifier, such as the IP address of the server S.

The mobile terminal MS sends 302 the first request for transmitting the first part via the mobile network MNW and the Internet, for instance, to the server S from which the data is to be downloaded. The 1st request may be transmitted by some conventional mobile data transmission technique supported by the MS and the mobile network MNW, for instance by using a PDP (Packet Data Protocol) context of the GPRS. The $2^{nd}$ request is first transmitted 303 to the intermediary device ID. For this, local connectivity may be used, or one or more intermediary networks, such as the mobile network MNW. The mobile terminal MS may be configured to first perform a radio scan to find out if the intermediary device ID is directly connectable for example by using Bluetooth procedures. If the ID can be connected, a (logical) connection may be arranged between the MS and the ID and the $2^{nd}$ request is transmitted. If no connection can be made, the $2^{nd}$ request may be transmitted to the telephone number or IP address of the intermediary device ID or to another intermediary device, or directly to the server S.

Reference is now made to FIG. 3b illustrating features that may be implementing in the intermediary device ID. In step 304, the intermediary device ID receives the $2^{nd}$ request from the mobile terminal MS. The intermediary device ID is configured to form 305 a request for the server S for transmitting the second part of the data to the intermediary device ID. Step 305 may be implemented in various ways: in one embodiment, a new request is formed, the request including identification information on the second part of the data based on the $2^{nd}$ request from the mobile terminal MS. With this embodiment, it is thus possible to arrange request conversion by the ID in to some other request/message format than what was used in the $2^{nd}$ request. In another embodiment, the intermediary device only forwards the $2^{nd}$ request to the server S. This may simply be done by forwarding the request (from which any MS-ID transmission specific headers are stripped off) to the mobile network MNW or some other network via which the $2^{nd}$ request can be delivered to the server S. In a third embodiment, the intermediary device ID is configured to modify the $2^{nd}$ request. For instance, the ID may replace the target address of the $2^{nd}$ request by the address of the server S. The intermediary device ID transmits 306 the request for transmitting the second part of the data to the server S.

On the basis of the first request, the first part of the data to be transferred to the mobile terminal MS connected to the mobile network MNW may be transmitted to a network element AD which transmits it directly to the mobile terminal MS. The $2^{nd}$ part of the data is transmitted to the intermediary device ID on the basis of the request from the ID; in one embodiment via the network element AD. In step 307, the intermediary device ID receives the message comprising the $2^{nd}$ part of the data. The intermediary device ID may forward 308 the second part of the data to the mobile terminal MS according to the underlying data transmission technique between the ID and the MS. According to an embodiment, the ID modifies the message comprising the $2^{nd}$ part or creates a new one, enabling conversion from one message format or even data representation format to another.

In step 309, the mobile terminal MS receives the $1^{st}$ part of the data from the network element AD and the $2^{nd}$ part of the data from the intermediary device ID. If necessary, the original format of the received data may be reinstated in step 310. The data may then be processed and/or stored by the application which has requested the data. If the method is implemented by another entity than the requesting application, the data is supplied to the requesting application.

The mobile terminal MS (in one embodiment the software process executing the method illustrated above) maintains information about the intermediary device(s) ID to which the request for data transfer has been sent and/or information on the requested data parts. At least in the case of more than one intermediary device ID, this embodiment is useful, since by comparing the received data the MS can then easily determine (by comparing the received data to the information on the requested data parts or by comparing the identifiers of the communications received from the intermediary devices ID with the maintained device information) when all data has been received and then continue to use the data and finish the method.

It is to be noted that the above features are only illustrative. There is no strict order for the method steps, for instance for the order of the $1^{st}$ and $2^{nd}$ requests. An exception may be made in those embodiments where the data parts need to be received in a certain order. Thus, the mobile terminal MS may even wait until the $1^{st}$ part of the data is received before sending the $2^{nd}$ request. Further, the method in FIGS. 3a and 3b is only one example. In an alternative embodiment, all the data needed by the mobile terminal MS may be delivered via one or more intermediary devices ID.

According to an embodiment, the desired data entity, such as a file, is divided into two or more parts and transferred by different routes. The mobile terminal MS is then configured to reinstate the original format in step 310. This embodiment may require additional functionality in the server S such that the server S is capable of separating the requested parts from the data entity in the original format and transferring them to the different devices. The MS may maintain information on the divisional parts and possibly on the original format, on the basis of which the MS is then capable of reinstating the original format. There are many possibilities to make this divisional transmission, some of which are illustrated in the following.

In one embodiment, the mobile terminal MS retrieves the structural description of a data entity, such as the file to be downloaded to the MS, before step 301 in FIG. 3a. The retrieval request may be sent after the mobile terminal MS has first determined the content type. For instance, the MS sends an HTTP request for an HTML or an XML page structure to a server S functioning as a HTTP server. The server S may then send the page structure indicating the contents of the original file but without any specific link or file contents actually being transmitted. When the mobile terminal MS receives the HTML or XML page structure, it finds out what contents still need to be downloaded in order to get all the data related to or embedded in the desired HTML or XML page. Based on a pre-determined division criterion, the MS determines (step 301) the downloadable parts on the basis of the page structure. It is to be noted that other kinds of file formats and structural descriptions may also be utilized, for example some other mark-up language, such as the WML (Wireless Mark-up Language).

In one embodiment, the parts downloaded through different routes are of different data formats. Image (still and especially video) files and audio files may be large and thus considerable reduction to downloading a multimedia representation may be achieved by transferring audio data of the representation separately from image data, for instance. There are multiple ways to implement this embodiment. The MS may be configured to select which data format is to be transferred via which route by applying a pre-determined selection scheme. The MS may be configured to send a request for a certain content type to a particular intermediary device ID on the basis of a simple preference list identifying the preferred intermediary devices ID, on the basis of the location of the MS/ID, on the basis of the properties of the ID and/or on the basis of some other preference criterion. This embodiment enables an efficient way to distribute the burden of data downloading.

Referring also to the embodiment utilizing the content structure information, in a further embodiment the mobile terminal MS determines the downloadable parts (step 301) on the basis of the HTML or XML page contents. The MS sends request(s) to one or more intermediary devices ID for different parts of the required data related to or embedded in the HTML or XML page. For instance, an HTML page may contain a link to an image and to a sound file. The mobile terminal MS may, on the basis of a predetermined selection criterion, send a request for the image file to a first intermediary device ID and another request for the audio file to a second intermediary device. These requests comprise a link, such as an URL (Uniform Resource Locator), to the respective file requested. In order to simplify the implementation, such a request between the MS and the ID may be in the form of an HTTP GET request. In this case, the intermediary device ID may function as an HTTP server. As already illustrated, the intermediary devices ID may be configured to send requests for the files to the server S having access to the requested files. When the intermediary devices ID receive responses from the server S, they forward the received audio file and the image file to the mobile terminal MS. The mobile terminal MS, for instance the HTML browser, may then construct the whole contents of the HTML page and resend it to the user via the user interface UI of the MS.

In one embodiment, the mobile terminal MS has or obtains knowledge of the size of the at least one file to be downloaded to the mobile terminal MS. The mobile terminal MS may define a certain portion of the file which a particular intermediary device ID shall acquire for the mobile terminal MS. For instance, if there is a file of 20 megabytes, the mobile terminal MS may define in step 301 that the first 10 megabytes will be directly requested from the server S and the remaining 10 megabytes will be transferred by the intermediary device ID. In this case, the mobile terminal MS defines in the requests (steps 302, 303) the area of the file requested. Instead of a division based on a certain amount of data, the division may be based on certain logical entities in a file. For instance, a metadata part of a file will be directly requested by the mobile terminal MS and transferred from the server S to the mobile terminal MS, whereas a media data portion of the file will be transferred via the intermediary device to the mobile terminal MS.

Contrary to the above examples, in an alternative embodiment the mobile terminal MS does not define the downloadable parts but sends only a request for all desired data. In a further embodiment, the intermediary devices ID themselves select the part(s) of the data which they will obtain for the mobile terminal MS. It is thus possible that, instead of master-slave type of relationship between the mobile terminal MS and the intermediary device ID, the intermediary devices ID are themselves active, and define the parts that they will acquire and/or which intermediary device(s) will be used to transfer the requested data to the mobile terminal. The mobile terminal MS may send the request for the desired data to all or some of the available intermediary devices ID. For instance, a multicast or a broadcast message to the local wireless network may be sent. An intermediary device ID may then select the part of the data which it will download and inform the other available intermediary devices and possibly also the mobile terminal MS of the selected part. In this way, the intermediary devices ID may select data parts which are not yet selected by some other intermediary device ID and send a request for the selected data part to the server S. When receiving the requested data parts, the intermediary devices ID may independently of each other forward the received data to the mobile terminal MS. This embodiment further makes it possible to efficiently utilize available resources, and it is possible that the intermediary devices ID select the data parts (e.g. certain content types) they have resources for or which they are authorized to transfer.

In another embodiment, the system comprises a further device or entity defining the downloadable parts on the basis of the request from the mobile terminal MS. This further device may then create and transmit the requests for the intermediate devices ID which may then act as already illustrated. Instead of transmitting the received data parts directly to the mobile terminal MS, the data parts may be transmitted from the intermediary devices to the further device. The further device may then reinstate the data in the original format and transmit the data to the mobile terminal MS.

In an embodiment, the mobile terminal MS utilizes property information of the available intermediary devices ID (e.g. reachable by a Bluetooth connection) in order to select the one or more intermediary devices ID to which the request(s) is sent (in step 303). In a further embodiment, information on the data transfer capabilities of an intermediary device ID is used. An intermediary device ID having the best data transmission capability amongst the available intermediary devices ID may be used, for instance. Another exemplary property that could be used is the amount of memory resources available in the ID. Property information may be passively obtained from the intermediary devices ID, actively inquired from the IDs, and/or it is possible to utilize pre-stored property information (e.g. in MS) associated with identifiers of the ID. It is further possible that the devices (ID) are themselves active, and advertise locally their properties and/or their readiness to be used as intermediary devices for downloading data to the mobile terminal. These advertisements may be transmitted by broadcast messages, for instance. An already existing method for obtaining property information and/or identifiers of the locally connectable intermediary devices ID may be used, or a specific mechanism may be developed for this. For instance, Bluetooth identification techniques may be used.

According to an embodiment, the mobile terminal MS is configured in step 310 simply to combine the first part and the second part before communicating the received data to an application that further processes the data. This embodiment may be utilized in many situations where the MS is capable of distinguishing the parts. If the parts are separately stored and can be identified in the requests, no changes are necessary to the functioning of the server S.

Some further embodiments which may be used in combination with at least some of the above embodiments are illustrated in the following. The mobile terminal MS may submit, preferably in the $2^{nd}$ request in steps 303, 304, timing information relating to the downloading of the $2^{nd}$ part of the data. The ID is then configured to send the request to the server S and/or to forward the received data from the server S to the mobile terminal MS in accordance with the timing information. The MS may indicate a certain time when the ID should act. It is also possible to indicate an automatic procedure, upon which the ID acts immediately, or a confirmation-based procedure, by which the ID can act only after it receives a subsequent confirmation to act from the MS.

The above embodiments mainly describe automatic features but user intervention may be arranged and required in the present method. For instance, user authorization may be required before sending the request to the ID and/or in the ID before sending a request from it to the server S. Further, the user may be provided with a possibility to adjust the functions in the ID and the MS, for example the criterion for selecting the division of data and/or the applied intermediary devices ID.

The intermediary device ID may be configured to submit status information to the mobile terminal MS related to the transmission/reception of the requested data. For instance, the ID may inform the MS about the amount of received/transmitted data, data transmission speed, or the estimated transmission time. Status information may be sent automatically or based on requests from the MS.

In one further embodiment, the mobile terminal MS is configured to reallocate, withdraw, or re-define requests. This follow-up may be based on the status information from the intermediary devices ID and/or based on the follow up performed by the mobile terminal MS. For instance, the MS may reduce the amount of data to be downloaded by an intermediary device ID if the transmission via this intermediary device ID has been slower than expected. In another embodiment, the mobile terminal MS removes the data transmission allocation from this intermediary device ID. The mobile terminal MS may assign a new request to a new intermediary device ID for transferring the remaining portion, or the whole data portion the allocation of which was removed from the earlier intermediary device ID.

The features illustrated above are suitable for implementation for separate data entity transmission as well as for streaming enabling substantially continuous data transmission for example for live broadcasts. Synchronization of the data streams by different routes may be required when using streaming, but it is possible to utilize different routes for different streams and already existing streaming and synchronization technologies. Some or all of the above features may be hid from the applications using the data in the mobile terminal MS, for example by an intermediary layer between the application layer and the transport layer, or by additional functionality in the transport layer.

Figure 4:
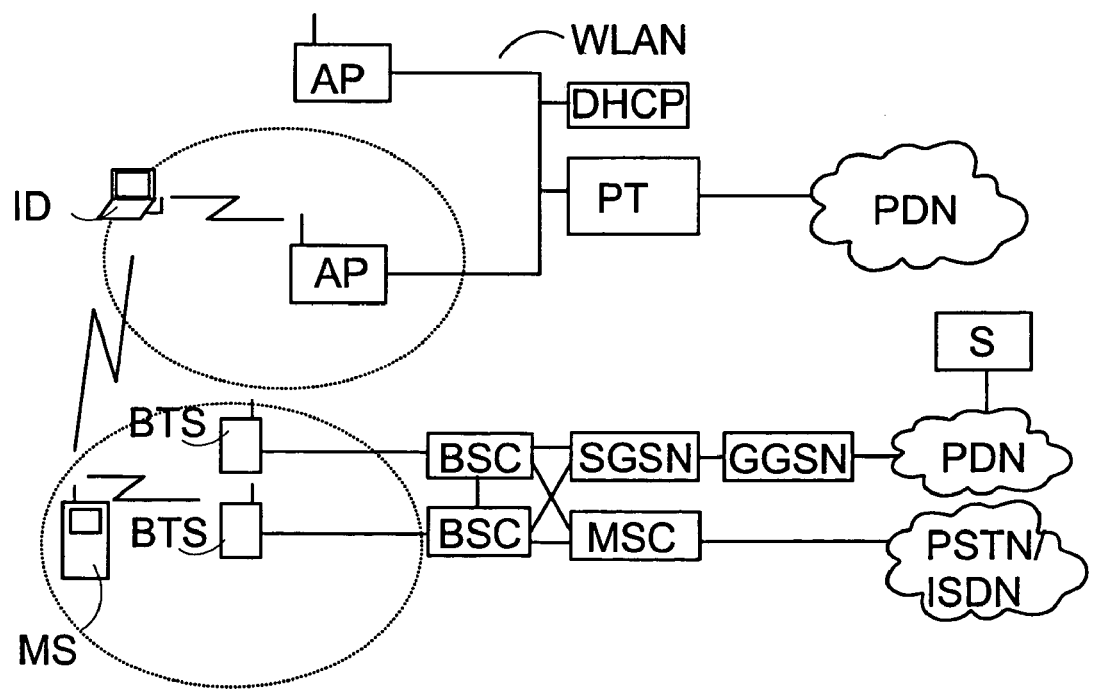
FIG. 4 illustrates a system comprising GSM/GPRS and WLAN network elements.

FIG. 4 shows one example of a suitable telecommunications system comprising a wireless local area network WLAN and a PLMN network, namely a GSM/GPRS network. The wireless local area network WLAN comprises access devices called access points AP that offer radio access to a mobile station MS and thus terminate the broadband radio link. The access point AP manages the radio interface in accordance with the radio technology used: in accordance with the IEEE 802.11 standard in one embodiment. A wireless network connection can also be set up directly between two devices (MS, ID) comprising a WLAN transceiver (Ad-hoc mode). The IEEE 802.11 specifications specify the protocols of both the physical layer and the MAC layer for data transfer over the radio interface. The AP also attends to the bridging or routing of radio interface data streams to and from other network nodes. The WLAN network may also provide a gateway interface to packet data networks PDN, such as the Internet, via a device called a portal PT or a bridge. Typically, the WLAN network also comprises other servers, such as a DHCP server (Dynamic Host Configuration Protocol) that allocates IP addresses to mobile stations MS. Typically, in the area where there is WLAN coverage, there is also PLMN coverage. It should be noted that the WLAN network may also comprise logical access points providing logical access to a network resource, which are not to be mixed with the physical access points (in FIG. 1, AP) acting as base stations and providing only radio access.

In the PLMN of FIG. 4, a mobile services switching center MSC provides the mobile station MS with circuit-switched services. A core network providing packet-switched services comprises a serving GPRS support node (SGSN) that serves mobile stations MS connected to a base station subsystem, and a gateway GPRS support node (GGSN) that provides a gateway function to external networks PDN, such as the Internet or a company's intranet. The system may also comprise other known network elements not shown in FIG. 4, such as a short message service centre and the elements of a billing system.

Both the SGSN and the MSC utilize the same base station system (BSS). The BSS comprises base transceiver stations (BTS) communicating with the mobile stations MS over a radio path and base station controllers (BSC) for controlling the radio frequencies and radio channels available to the base transceiver stations BTS connected to them. A base transceiver station BTS always comprises at least one transceiver that implements one carrier, i.e. eight timeslots, i.e. eight physical channels. One base transceiver station BTS typically serves one cell, but a solution is feasible wherein one base transceiver station BTS serves several sectored cells. The cells overlap slightly such that the connection can be maintained when the mobile station MS is moving from the coverage area of a BTS to another. In the example of FIG. 4, the MS may communicate with WLAN and GSM/GPRS networks.

It will be obvious to a person skilled in the art that, as the technology advances, the inventive concept can be implemented in various ways. For instance, the invention may be applied to systems of other types than the one illustrated in FIG. 4. The invention and its embodiments are not limited to the examples described above but may vary within the scope of the claims.

The invention claimed is:

1. A method comprising:
 defining, in response to a need to request data from a data originating device for a first mobile terminal, a first part and a second part of the data to be requested by the first mobile terminal,
 defining a request identifying at least part of the data required by the first mobile terminal,
 sending the request to at least one intermediary mobile terminal,
 sending from the intermediary mobile terminal to the data originating device a request for transmitting the data requested by the first mobile terminal,
 arranging transmission of the first part and the second part via different routes, and
 transmitting the received data from the intermediary mobile terminal to the first mobile terminal.

2. The method according to claim 1, the method comprising:
 sending a first request from the first mobile terminal for transmitting the first part of the data via a network element of a mobile network to the data originating device without intervention from the intermediary mobile terminal,
 sending a second request from the first mobile terminal to the intermediary mobile terminal for transmitting the second part of the data,
 sending from the intermediary mobile terminal to the data originating device a request for transmitting the second part of the data,
 transferring the first part of the data from the network element to the first mobile terminal and the second part of the data to the intermediary mobile terminal,
 transmitting the second part of the data from the intermediary mobile terminal to the first mobile terminal, and
 receiving in the first mobile terminal the first part of the data from the network element and the second part of the data from the intermediary mobile terminal.

3. The method according to claim 1, wherein a structure of the data entity is obtained,
 the division to the first part and the second part is determined based on a pre-determined division criterion and the structure of the data entity, and
 the received data is reinstated to the original format by the first mobile terminal.

4. The method according to claim 1, wherein the definition of the first part and the second part is arranged such that the first part and the second part are of different data format.

5. The method according to claim 1, wherein availability information on available intermediary mobile terminals is obtained from the first mobile terminal, and
 the applied at least one intermediary mobile terminal is selected on the basis of the availability information.

6. The method according to claim 1, wherein properties of available intermediary mobile terminals are obtained from the first mobile terminal, and
 the at least one intermediary mobile terminal is selected based on the properties.

7. The method according to claim 1, wherein the data transfer between the mobile terminal and the intermediary mobile terminal is arranged by a wireless local area networking technique.

8. The method according to claim 1, wherein the request identifying at least part of the data is defined in a further device on the basis of a request for the data required by the mobile terminal, and the request is sent from the further device to at least one intermediary mobile terminal.

9. A system comprising:
 a first mobile terminal, and
 at least one intermediary mobile terminal, wherein
 the first mobile terminal is configured to define, in response to a need to request data from a data originating device for the first mobile terminal, a first part and a second part of the data to be requested by the first mobile terminal, and a request identifying at least part of the required data,
 the first mobile terminal is configured to send the request to at least one intermediary mobile terminal and to arrange transmission of the first part and the second part via different routes,
 the intermediary mobile terminal is configured to send to the data originating device a request for transmitting the data requested by the first mobile terminal, and
 the intermediary mobile terminal is configured to transmit the received data to the first mobile terminal.

10. The system as claimed in claim 9, wherein the intermediary mobile terminal comprises means for connecting to the same mobile network as the mobile terminal and is configured to receive the second part of the data via the mobile network.

11. A mobile terminal comprising:
 transceiver means for data transmission with an intermediary mobile terminal, wherein
 the mobile terminal is configured to define, in response to a need to request data from a data originating device for the mobile terminal, a first part and a second part of the data to be requested by the first mobile terminal and a request identifying at least part of the required data,
 the mobile terminal is configured to arrange the transmission of the first part and the second part via different routes,
 the mobile terminal is configured to send the request to at least one intermediary mobile terminal, and
 the mobile terminal is configured to receive the requested data from the intermediary mobile terminal.

12. The mobile terminal according to claim 11, wherein
the mobile terminal further comprises transceiver means for data transmission with a network element of a mobile network,
the mobile terminal is configured to send a first request for transmitting the first part of the data via a network element of a mobile network to the data originating device without intervention from the intermediary mobile terminal,
the mobile terminal is configured to send a second request to the intermediary mobile terminal for transmitting the second part of the data,
the mobile terminal is configured to receive the first part of the data from the network element, and
the mobile terminal is configured to receive the second part of the data from the intermediary mobile.

13. The mobile terminal according to claim 11, wherein the mobile terminal is configured to obtain the structure of the data entity,
the mobile terminal is configured to define the division to the first part and the second part based on a pre-determined division criterion and the structure of the data entity, and
the mobile terminal is configured to reinstate the received data to the original format.

14. The mobile terminal according to claim 11, wherein the mobile terminal is configured to define the first part and the second part such that the first part and the second part are of different data format.

15. The mobile terminal according to claim 11, wherein the mobile terminal is configured to obtain availability information on available intermediary mobile terminals, and
the mobile terminal is configured to select the applied at least one intermediary mobile terminal on the basis of the availability information.

16. The mobile terminal according to claim 11, wherein the mobile terminal is configured to obtain properties of available intermediary mobile terminals, and
the mobile terminal is configured to select the at least one intermediary mobile terminal based on the properties of the available intermediary mobile terminals.

17. The mobile terminal according to claim 11, wherein the data transfer between the mobile terminal and the intermediary mobile terminal is arranged by a wireless local area networking technique.

18. A mobile terminal comprising transceiver means for data transmission with a mobile terminal, wherein
the mobile terminal is configured to receive a request identifying requested data from a data requesting mobile terminal,
the mobile terminal is configured to send to a data originating device a request for transmitting the data requested by the requesting mobile terminal, and
the mobile terminal is configured to modify received data and transmit the received data to the requesting mobile terminal.

19. The mobile terminal according to claim 18, wherein data transmission between the mobile terminal and the requesting mobile terminal is arranged by a wireless local area networking technique.

20. A detachable hardware module for a mobile terminal, the module comprising:
means for causing the mobile terminal to define, in response to a need to request data from a data originating device for the mobile terminal, a first part and a second part of the data to be requested by the first mobile terminal and a request identifying at least part of the required data,
means for causing the mobile terminal to arrange the transmission of the first part and the second part via different routes,
means for causing the mobile terminal to send the request to at least one intermediary mobile terminal, and
means for causing the mobile terminal to receive the requested data from the intermediary mobile terminal.

21. A detachable hardware module for a mobile terminal, the module comprising:
means for causing the mobile terminal to receive a request identifying requested data from a data requesting mobile terminal,
means for causing the mobile terminal to send to a data originating device a request for transmitting the data requested by the requesting mobile terminal, and
means for causing the mobile terminal to modify received data and transmit the received data to the requesting mobile terminal.

22. A computer readable medium encoded with a computer program for controlling a mobile terminal by executing a program code in a processor of the mobile terminal, the computer program comprising:
a program code portion for causing the mobile terminal to define, in response to a need to request data from a data originating device for the mobile terminal, a first part and a second part of the data to be requested by the first mobile terminal and a request identifying at least part of the required data,
a program code portion for causing the mobile terminal to arrange the transmission of the first part and the second part via different routes,
a program code portion for causing the mobile terminal to send the request to at least one intermediary mobile terminal, and
a program code portion for causing the mobile terminal to receive the requested data from the intermediary mobile terminal.

23. A computer readable medium encoded with a computer program for controlling a mobile terminal by executing a program code in a processor of the mobile terminal, the computer program comprising:
a program code portion for causing the mobile terminal to receive a request identifying requested data from a data requesting mobile terminal,
a program code portion for causing the mobile terminal to send to a data originating device a request for transmitting the data requested by the requesting mobile terminal, and
a program code portion for causing the mobile terminal to modify received data and transmit the received data to the requesting mobile terminal.

* * * * *